UNITED STATES PATENT OFFICE.

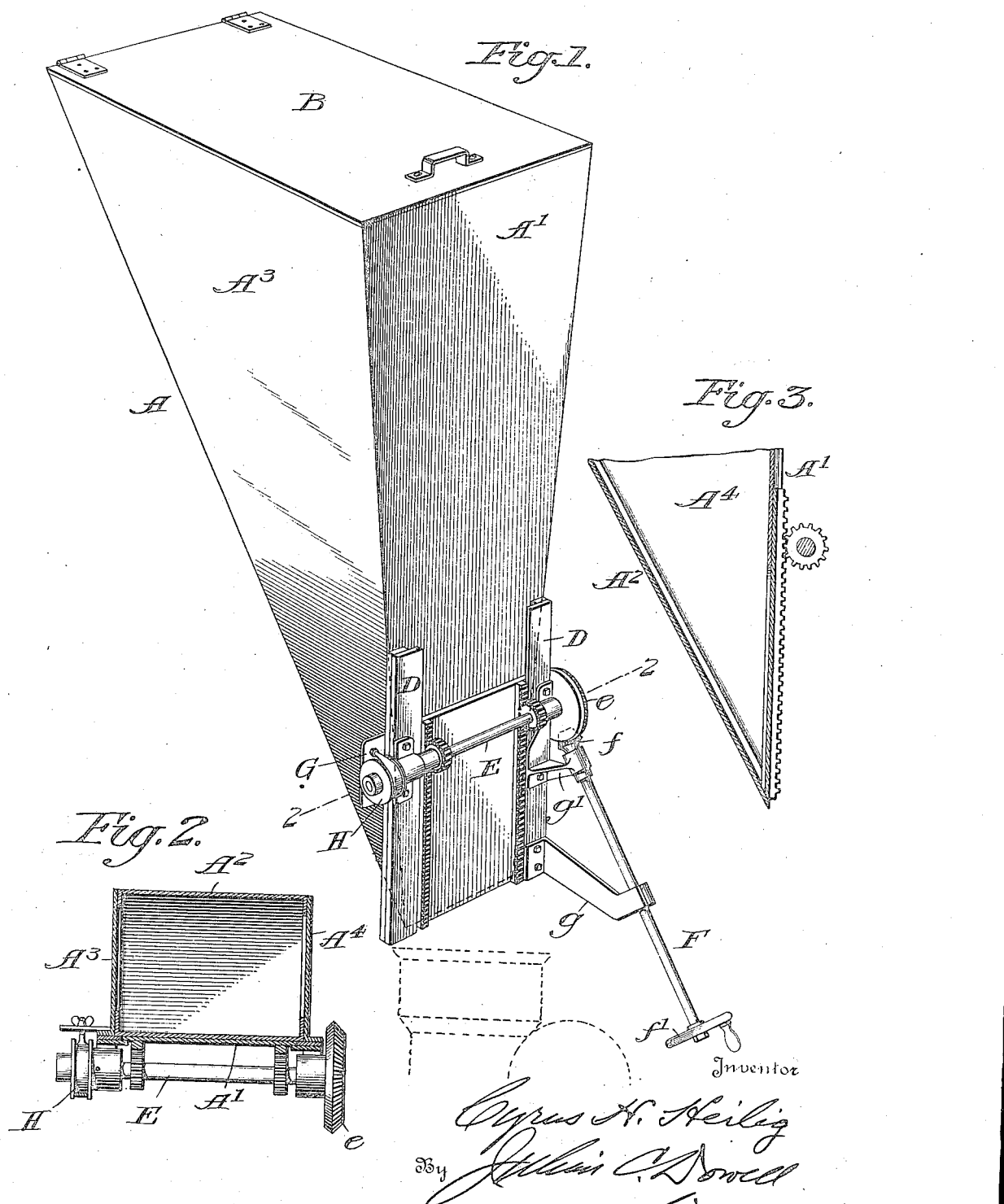

CYRUS HOYT HEILIG, OF YORK, PENNSYLVANIA.

DOUGH-CHUTE FOR DOUGH-DIVIDER HOPPERS.

1,219,737.

Specification of Letters Patent.  Patented Mar. 20, 1917.

Application filed July 7, 1916. Serial No. 108,005.

*To all whom it may concern:*

Be it known that I, CYRUS H. HEILIG, a citizen of the United States, residing at York, in the county of York and State of Pennsylvania, have invented certain new and useful Improvements in Dough-Chutes for Dough-Divider Hoppers; and I do hereby declare the following to be a full, clear, and exact description of the invention, such as will enable others skilled in the art to which it appertains to make and use the same.

This invention relates to the means employed for feeding dough to dough-divider hoppers or machines for dividing and molding dough for bakers' use in making bread.

It is very important in dividing dough by means of a dough-divider, in order to get accurate and uniform scaling, that the dough in the dough-divider hopper be kept at a uniform height or weight, and one object of my invention is to accomplish this result and to provide an improved dough chute for feeding dough to a dough-divider hopper or other machine with a regulated flow, the chute being so constructed as to cause the dough to gravitate or travel in a downward course along an inclined plane toward the front of the chute where it is discharged into the dough-divider hopper or other machine requiring a feed with a regulated flow. A further object is to provide a dough chute that may be easily cleaned and kept clean, and which will overcome the trouble and inconvenience incident to cleaning the devices heretofore ordinarily employed for feeding dough. In the illustrated embodiment of my invention opposite sides of the chute or conveyer converge from their upper to their lower ends and each side is wider at the top than at the bottom; the front and back being only a little wider at top than at the bottom and meeting at the lower end of the chute, while the other two sides are separated the width of said front and back; said sides being of triangular form and much wider at their upper ends than the front and back portions and tapering abruptly to a point at their lower ends, while the front and back portions taper gradually from their upper to their lower ends, thus forming a chute or conveyer which is oblong in cross-section at both its upper and lower ends, the greater length of the lower end being at right angles to the greater length of the upper end, and the interior of the chute being plain and smooth its full length, so that the dough is not liable to lodge at any point, and a steeply inclined surface or bottom is formed by the rear side thereof, which confronts a perpendicular wall, whereby the dough is caused to descend by gravity along a steeply inclined plane and is compressed by its own weight between the converging walls and discharged in a comparatively thin and compressed sheet or mass of oblong form in cross-section, and by means of the adjustable door and friction device the operator is enabled to enlarge or contract the size of the discharge opening with nicety and retain it at any desired point for feeding in larger or smaller measure, as desired.

The invention will first be hereinafter more particularly described, with reference to the accompanying drawings, which are to be taken as a part of this specification, and then pointed out in the claim at the end of the description.

In said drawings,

Figure 1 represents a perspective view of a dough chute embodying my invention;

Fig. 2 is a transverse section taken on the line 2—2 of Fig. 1; and

Fig. 3 is a detail vertical sectional fragmentary view taken through the lower end of the chute.

Referring to said drawings, in which the same letters of reference are used to denote corresponding parts in different views, the letter A may denote a hollow body which, in the form shown, has four sides, or front and back portions $A^1$ and $A^2$, which converge and meet at their lower ends, and opposite side portions $A^3$ and $A^4$, which converge to a point near their lower ends, but do not meet, being separated the full length and width of said front and back portions, the latter gradually diminishing in width toward their lower ends, and said side portions having one straight edge and one edge inclined at an angle of about 45° to said straight edge, the two edges coming to a point at their lower ends, whereby the chute is enlarged toward its upper end and tapers on all sides to its lower end, so that the dough is caused to descend by gravity along a steeply inclined plane or bottom and is compressed between converging walls to the point or discharge. The upper end of the chute is closed by a hinged door B, adapted to be lifted and thrown back out of the way when dough is to be placed in the chute. As will be seen, the opposite sides $A^3$ and $A^4$ are substantially triangular in form and the front portion $A^1$ is secured to the straight edges thereof so that it stands substantially perpendicular to the base, while the back portion $A^2$ is secured to the inclined edges of said sides and stands at an angle of about 45° to said front portion, so that the chute gradually diminishes in size from top to bottom or tapers downwardly on all sides to a point, at which one side or the front thereof is cut away to form a discharge opening which is closed by a sliding door C, for controlling the flow of dough from the chute into the divider hopper or other machine in connection with which the chute is used. All four sides and the top of the chute may consist of sheet metal, preferably steel, though any suitable material may be used. The door C may consist of a flat steel plate having secured thereto rack bars $c$, the edges of the door being slidably fitted in guides D which may consist of angle steel plates secured to the front of the chute so as to overlap the edges of the sliding door, and to said guides may be secured suitable bearings for a shaft E having gear wheels or pinions thereon which mesh with said rack bars so that when the shaft is turned the door will be raised or lowered, according to the direction of rotation of the shaft.

The shaft E may be driven by means of an inclined shaft F supported in brackets $g$, $g^1$, and having a bevel gear or pinion $f$ on one end thereof engaging a bevel gear $e$ on one end of the shaft E. The shaft F may be operated by means of a hand wheel $f^1$ thereon for imparting motion to the shaft E for raising or lowering the door.

In using this chute, it is desirable to provide a brake for holding the door at any desired height, and to this end I provide a band wheel H on the shaft E which is partly encircled by a light steel band or strap $h$ having threaded ends which enter apertures in a plate G at one side of the chute and have thumb screws or nuts thereon for tightening the band so that it may be caused to bear with greater or less force to increase or decrease at will the power required to operate the door and adapt the door to be held at any desired height to which it may be adjusted by frictional contact between said band wheel and band. The dotted lines immediately below the chute indicate a dough-divider hopper adapted to receive the dough as it leaves the chute.

The utility and advantages of my improvement and its mode of operation will be readily understood from the foregoing description, taken in connection with the accompanying drawings. By means of my improved chute a steady stream of dough may be caused to flow by gravity into the divider hopper and the supply may be varied and controlled at the will of the operator in such manner as to keep the divider hopper supplied with an even amount of dough, by discharging the same quantity of dough into the dough-divider hopper that the latter discharges in loaves to a conveyer; and as the sides of the chute are flat it can be easily cleaned. The construction is such that the chute may serve to convey dough from an upper floor to a lower floor direct into a dough divider hopper or other machine that it may be necessary to supply with dough or other material in a uniform quantity, and the dough is caused to descend by great force of gravity along a steeply inclined way, between converging walls, so that it is compressed with increasing force as it approaches the point of discharge, and the pressure to which the dough is thus subjected keeps it from aging or forming gases while in the hopper or conveyer, and in turn produces a close grained and better loaf of bread. The described construction and arrangement also enables the operator to see the amount of material that is being supplied to the machine, or the amount of dough going into the dough divider, as there is nothing to obstruct his view, and he can arrange the feed from the chute or conveyer to equal the demand that is necessary to keep the dough divider supplied. The force of gravity is also sufficient to keep the dough moving all the time and prevent it from sticking to the conveyer walls, thus insuring a clean and sanitary conveyer, without the use of labor in cleaning, and together with the means for regulating the flow enables the operator to keep the dough at a standard level, which will insure uniform and accurate scaling. If desired dough may be conveyed from a 2nd or 3rd or higher floor direct into a dough divider hopper or other machine located on a lower floor, by merely increasing the length of the chute, and without the use of a pipe or other conveyer to obstruct the view of the operator, so that he cannot tell the amount of dough that is being fed to the receiving machine. It will be understood of course that the wider the door is opened the more dough will flow from the chute, and vice versa, and that the door can be shut off so as to cut off the entire flow when necessary or desirable.

Having thus described my invention, what I claim as new and desire to secure by Letters Patent of the United States is:

A chute or conveyer for feeding dough to a dough-divider hopper, said chute enlarging toward its upper end and tapering on all sides to its lower end, all of its sides being plain and opposite confronting sides thereof converging from their upper to their lower ends, the front presenting a continuous unobstructed surface and having a discharge opening therein at its lower end, and the back arranged at an acute angle to said front and steeply inclined so that the dough descends by gravity and is compressed on all sides with increasing force between converging walls, and means for regulating the flow through said discharge opening.

In testimony whereof I affix my signature in the presence of two witnesses.

CYRUS HOYT HEILIG.

Witnesses:
   EDWARD J. LOUCKS,
   K. S. MEASE.